US012545073B2

United States Patent
Moon et al.

(10) Patent No.: US 12,545,073 B2
(45) Date of Patent: Feb. 10, 2026

(54) AIR CONDITIONER HOUSING FOR A VEHICLE

(71) Applicants: HYUNDAI MOTOR COMPANY, Seoul (KR); KIA CORPORATION, Seoul (KR); Hanon Systems, Daejeon (KR)

(72) Inventors: Seung Hoon Moon, Suwon-si (KR); Myung Hoe Kim, Seoul (KR); Yoon Hyung Lee, Seongnam-si (KR); Seung Ho Lee, Daejeon (KR); Sang Ki Lee, Daejeon (KR); Yong Sik Kim, Daejeon (KR); Dae Bok Keon, Daejeon (KR); Dae Keun Park, Daejeon (KR)

(73) Assignees: HYUNDAI MOTOR COMPANY, Seoul (KR); KIA CORPORATION, Seoul (KR); Hanon Systems, Daejeon (KR)

( * ) Notice: Subject to any disclaimer, the term of this patent is extended or adjusted under 35 U.S.C. 154(b) by 215 days.

(21) Appl. No.: 18/221,721

(22) Filed: Jul. 13, 2023

(65) Prior Publication Data

US 2024/0174043 A1    May 30, 2024

(30) Foreign Application Priority Data

Nov. 24, 2022    (KR) ................. 10-2022-0159263

(51) Int. Cl.
*F24F 13/22*    (2006.01)
*B60H 1/00*    (2006.01)
(Continued)

(52) U.S. Cl.
CPC ..... *B60H 1/00028* (2013.01); *B60H 1/00871* (2013.01); *B60H 1/3233* (2013.01)

(58) Field of Classification Search
CPC .............. F24F 2013/227; F24F 13/222; B60H 1/3233; F28F 17/005
See application file for complete search history.

(56) References Cited

U.S. PATENT DOCUMENTS 5,481,886 A * 1/1996 Hasegawa ............. F28D 1/0341
                                                          62/285
2018/0195817 A1* 7/2018 Uhland ................. F28F 17/005
(Continued)

FOREIGN PATENT DOCUMENTS

JP    H08258555 A    10/1996
JP    H09175160 A    7/1997
(Continued)

*Primary Examiner* — Frantz F Jules
*Assistant Examiner* — Jason N Thompson
(74) *Attorney, Agent, or Firm* — Lempia Summerfield Katz LLC

(57) ABSTRACT

An air conditioner housing of a vehicle includes a body having an internal space through which air flows and having a heat exchanger mounted at the internal space. The heat exchanger cools the air. A discharge port is at a lower end of the body and provides fluid communication between the internal space and an exterior of the body and discharges condensate water generated from the heat exchanger to the exterior. A plurality of blocking portions is disposed around the discharge port and protrudes into the internal space, thereby preventing foreign substances inside the body from directly blocking the discharge port.

11 Claims, 5 Drawing Sheets

(51) Int. Cl.
*B60H 1/32*        (2006.01)
*F28F 17/00*       (2006.01)

(56)                References Cited

U.S. PATENT DOCUMENTS

| | | | |
|---|---|---|---|
| 2019/0056142 A1* | 2/2019 | Jeansonne | C02F 1/688 |
| 2019/0226775 A1* | 7/2019 | Lorang | F24F 1/02 |
| 2022/0090819 A1* | 3/2022 | Nunn | F24F 13/222 |
| 2022/0146145 A1* | 5/2022 | Hatcher | F24F 13/222 |

FOREIGN PATENT DOCUMENTS

| | | |
|---|---|---|
| JP | 2570419 Y2 | 2/1998 |
| KR | 0122582 Y1 | 8/1998 |
| KR | 101484711 B1 | 1/2015 |
| KR | 20220124965 A | 9/2022 |

\* cited by examiner

AIR CONDITIONER HOUSING FOR A VEHICLE

CROSS REFERENCE TO RELATED APPLICATION

The present application claims priority to Korean Patent Application No. 10-2022-0159263, filed Nov. 24, 2022, the entire contents of which are incorporated herein for all purposes by this reference.

BACKGROUND

Field of the Disclosure

The present disclosure relates to an air conditioner housing for a vehicle. The air conditioner housing can effectively prevent a phenomenon in which a discharge port is blocked by foreign substances when condensate water generated during the operation of an air conditioner, is discharged to the outside of the housing. The air conditioner housing is also configured to smoothly discharge the condensate water.

Description of the Related Art

A vehicle is provided with an air conditioner to realize a comfortable interior environment by controlling the air temperature and discharging the air to the interior of the vehicle.

In such an air conditioner, a heating core and a cooling core are mounted inside a housing. By exchanging heat between each core and the air flowing into the air conditioner, air at a suitable temperature is provided and discharged into the interior of the vehicle.

A cold refrigerant or a cold coolant flows inside the cooling core. The cooling core is configured to cool air by performing heat exchange with air that flows outside, i.e., over the cooling core. In this heat exchange process, absolute moisture in the flowing air is condensed on a surface of the cooling core and condensate water is generated. As a result, air in a state in which both humidity and temperature are lowered is supplied to the interior of the vehicle.

Condensate water generated on the surface of the cooling core falls to the bottom surface of the housing. The falling condensate water collected and accumulated on the bottom of the housing may be mixed with air flow and may be discharged to the interior of the vehicle. In addition, condensate water may increase the level of humidity in the air supplied to the interior of the vehicle, thus reducing any air cooling effect.

Therefore, condensate water inside such an air conditioner is required to be effectively discharged to the exterior of the housing (e.g., outside).

However, in some cases, as external air is introduced into an inner portion or interior of the air conditioner housing, fallen leaves or foreign substances may be introduced together with the external air into the inner portion of the air conditioner housing. In this situation, when introduced foreign substances are very small in size, there is no problem. However, when the introduced foreign substances are too large (i.e., the sizes of the foreign substances are equal to or more than a predetermined level), the foreign substances may block a discharge port inside the housing. Thus, a problem may occur in that condensate water accumulates and overflows in the interior of the air conditioner housing.

The foregoing is intended merely to aid in the understanding of the background of the present disclosure. The foregoing is not intended to mean that the present disclosure falls within the purview of the related art that is already known to those having ordinary skill in the art.

SUMMARY

Therefore, in view of the foregoing, a structure is required in which condensate water is capable of being discharged smoothly while the discharge port of the housing is not blocked by foreign substances.

Accordingly, the present disclosure has been made keeping in mind the above problems occurring in the related art. An objective of the present disclosure is to provide an air conditioner housing for a vehicle. Another objective is to provide an air conditioner housing capable of effectively preventing a phenomenon in which a discharge port is blocked by foreign substances when condensate water is generated during operation of an air conditioner. In preventing the phenomenon described above, the air conditioner housing is configured to smoothly discharge the condensate water to the exterior of the housing.

In order to achieve the above objectives, an air conditioner housing for a vehicle is provided. The air conditioner housing includes a body having an internal space through which air flows and having a heat exchanger mounted at the internal space. The heat exchanger is configured to cool air. The air conditioner housing also includes a discharge port formed at a lower end of the body. The discharge port is configured to provide fluid communication between the internal space and an exterior of the body. The discharge port is also configured to discharge condensate water generated from the heat exchanger to the exterior of the body. Furthermore, the air conditioner housing includes a plurality of blocking portions disposed around the discharge port and protruding into the internal space of the body. Thus, the plurality of blocking portions prevents foreign substances inside the body from directly blocking the discharge port.

A lower portion of the body may have an inclined surface having a width that gradually narrows downward.

The discharge port may be disposed at a lowermost end of the inclined surface of the lower portion of the body.

The lower end of the body may have an exterior surface and a nozzle may extend tot eh exterior from the discharge port. The nozzle may be oriented at an angle toward a side direction.

The nozzle may be integrally molded with the body.

The discharge port may have a first side having a shape that is recessed toward a center of the discharge port.

The lower end of the body may have an exterior surface provided with a nozzle that extends to the exterior from the discharge port. The nozzle may be oriented at an angle toward a side direction that is opposite to a direction in which the first side of the discharge port is recessed.

Each blocking portion of the plurality of blocking portions may have a pin shape that extends upward from a lower interior surface of the body.

The plurality of blocking portions may include a plurality of pins disposed spaced apart from each other. The plurality of pins may be positioned in a plurality of layers surrounding the lowermost end of the body.

The plurality of blocking portions may be integrally molded with the body.

The plurality of blocking portions may include a plurality of pins. A height of each of the plurality of pins may be equal to or more than a diameter of the discharge port.

The plurality of blocking portions may include a plurality of pins and a separation distance between the plurality of pins may be equal to or less than a diameter of the discharge port.

The plurality of blocking portions may include a plurality of pins and pins closest to the lowermost end of the body may be spaced apart from a lowermost point of the body.

According to the air conditioner housing of the vehicle of the present disclosure, in discharging condensate water generated during operation of an air conditioner of the housing to the outside of the housing, a phenomenon in which the discharge port is blocked by foreign substances may be effectively prevented. Thus, discharging condensate water may be smoothly performed.

Particularly, as the blocking portions are formed of the plurality of pins, and the sizes and distances of the pins and a relationship of the pins to the discharge port are optimally set, foreign substances of any size may be prevented from blocking the discharge port.

In addition, even if foreign substances are caught in the blocking portions, the basic condensate water drainage function of the discharge port may not be deteriorated.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

Figure 1:
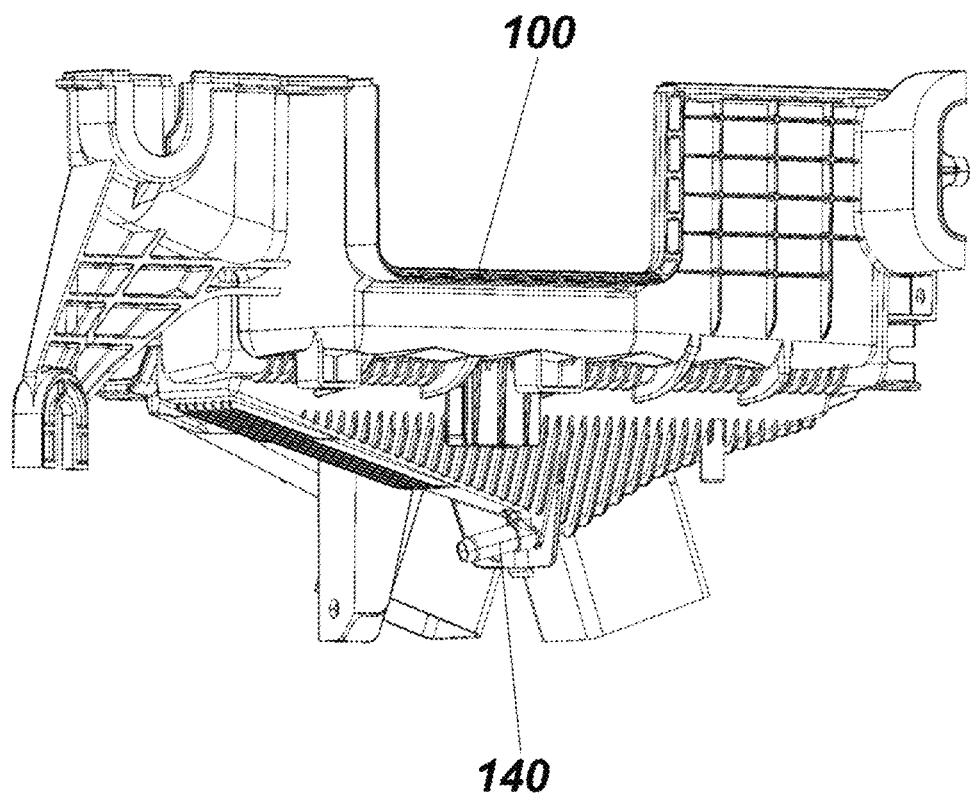
FIG. 1 is a perspective view illustrating an air conditioner housing for a vehicle according to an embodiment of the present disclosure.

Hereinafter, embodiments disclosed in the present specification are described in detail with reference to the accompanying drawings. In the present specification, the same or similar components are denoted by the same or similar reference numerals, and repetitive descriptions thereof have been omitted.

A detailed description of known technologies has been omitted where it has been determined that the detailed description of the known technologies obscures the embodiments of the disclosure. In addition, the accompanying drawings are merely intended to help describe the embodiments of the disclosure. Furthermore, the spirit and technical scope of the present disclosure is not limited by the accompanying drawings. It should be understood that the present disclosure is not limited to specific disclosed embodiments, but includes all modifications, equivalents, and substitutes included within the spirit and technical scope of the present disclosure.

Terms including ordinals such as "first" or "second" used herein may be used to describe various elements, but the elements are not limited by the terms. The terms are only used for the purpose of distinguishing one element from another element.

Singular expressions include plural expressions unless the context clearly indicates otherwise.

It is to be understood that terms such as "including," "having," and the like, and variations thereof, are intended to indicate the existence of the features, numbers, steps, actions, elements, components, or combinations thereof disclosed in the specification. The terms are not intended to preclude the possibility that one or more other features, numbers, steps, actions, elements, components, or combinations thereof may exist or may be added.

In the following description, the suffixes "module" and "portion" contained in terms of constituent elements described below are selected or used together in consideration of only the convenience of writing the following specification. The suffixes "module" and "portion" do not necessarily have different or specific meanings or roles.

When a component is referred to as being "connected" to or "in contact" with another component, it should be understood that it may be directly connected to or in contact with the other component, but other components may exist therebetween. On the other hand, when a component is referred to as being "directly connected" to or "directly in contact" with another component, it should be understood that there is no other component therebetween.

Figure 2:
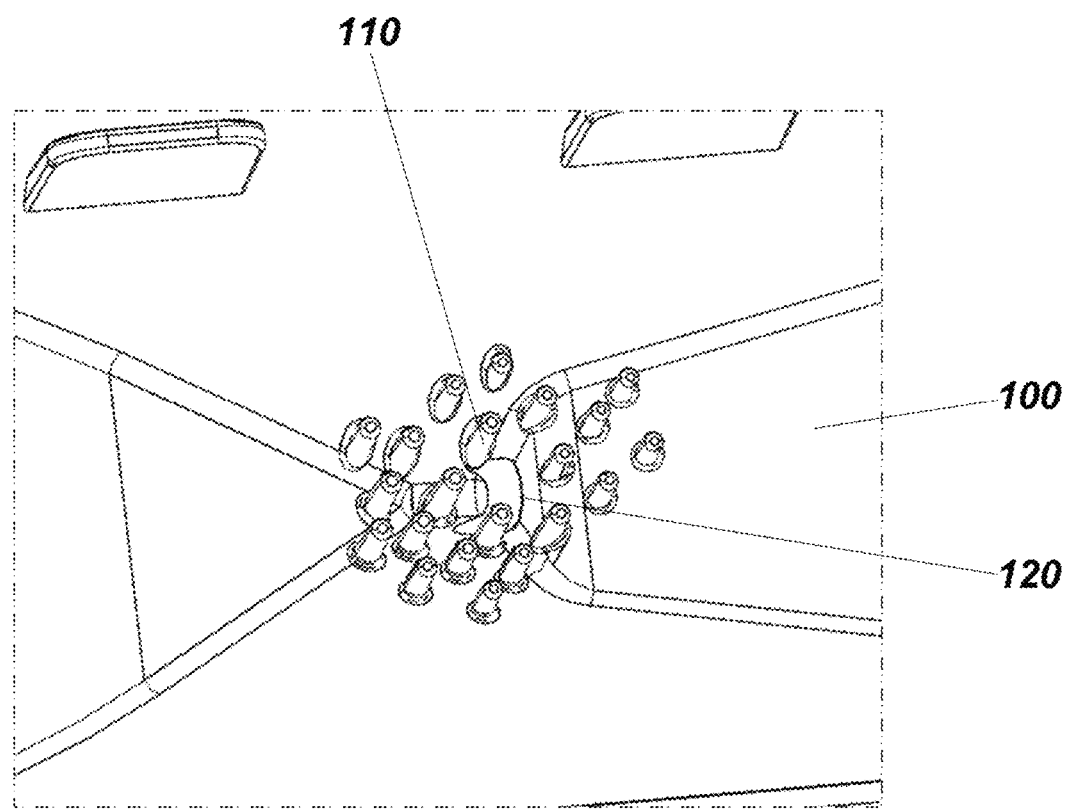
FIGS. 2 and 3 are views illustrating an interior portion of the air conditioner housing for a vehicle according to an embodiment of the present disclosure.
Figure 3:
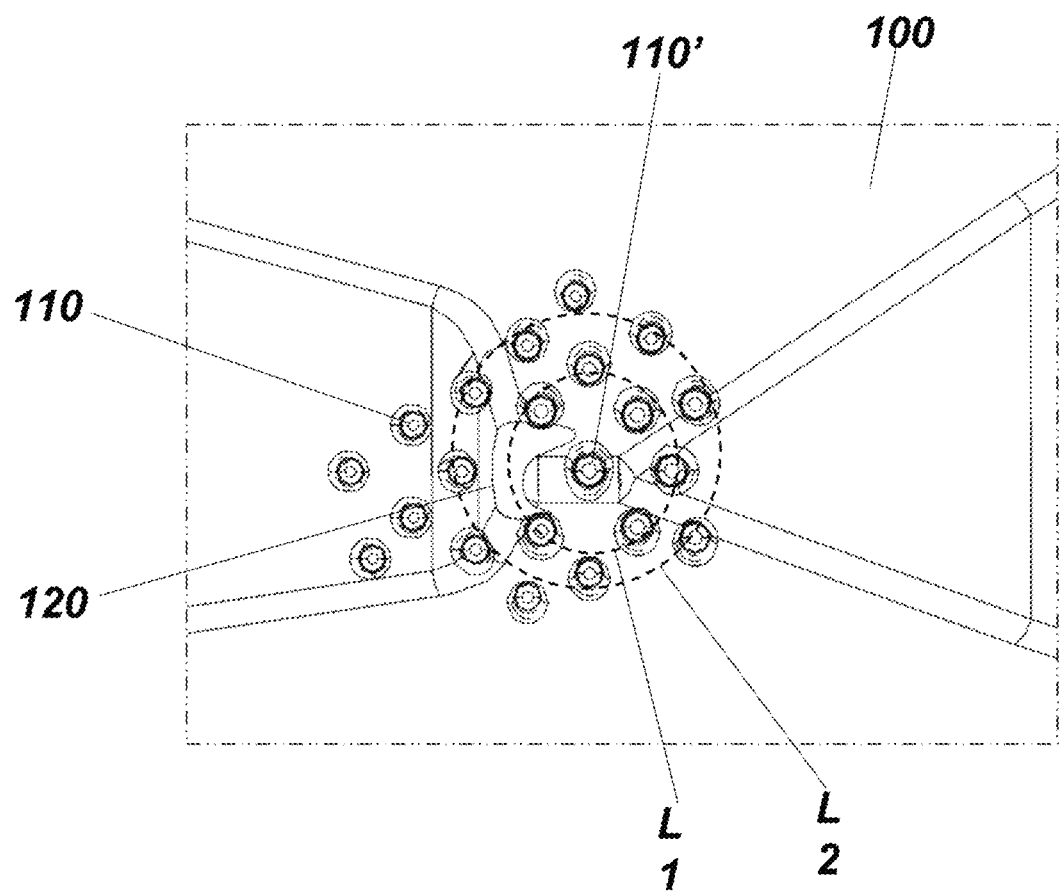
Figure 4:
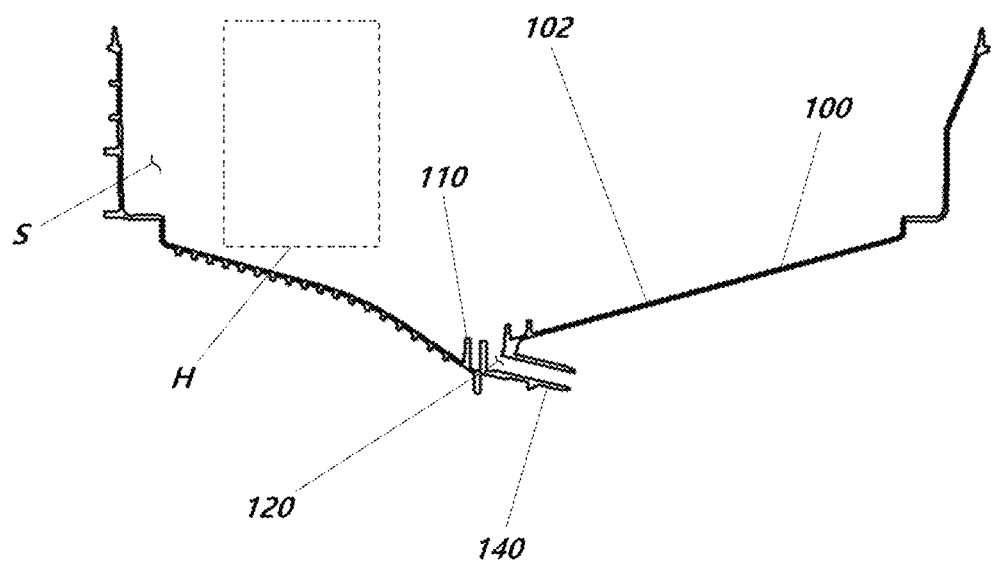
FIG. 4 is a cross-sectional view illustrating the air conditioner housing for a vehicle according to an embodiment of the present disclosure.
Figure 5:
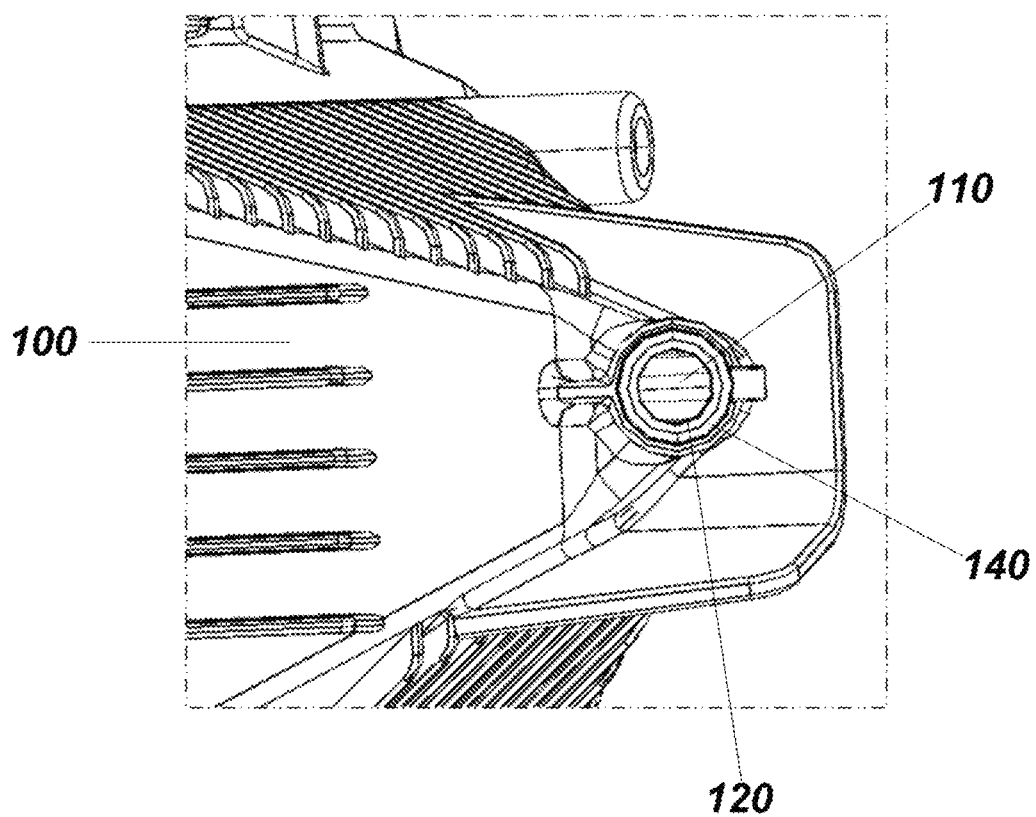
FIG. 5 is a side view illustrating the air conditioner housing for a vehicle according to an embodiment of the present disclosure.

FIG. 1 is a perspective view illustrating an air conditioner housing for a vehicle according to an embodiment of the present disclosure. FIGS. 2 and 3 are views illustrating an interior portion of the air conditioner housing for a vehicle according to an embodiment of the present disclosure. FIG. 4 is a cross-sectional view illustrating the air conditioner housing for a vehicle according to an embodiment of the present disclosure. FIG. 5 is a side view illustrating the air conditioner housing for a vehicle according to an embodiment of the present disclosure.

FIG. 1 is a perspective view illustrating an air conditioner housing for a vehicle according to an embodiment of the present disclosure. The air conditioner housing for the present disclosure includes a body 100 having an internal space S through which air flows and having a heat exchanger H mounted at the internal space. The heat exchanger H is configured to cool the air. The air conditioner housing further includes a discharge port 120 formed at a lower end of the body 100. The discharge port 120 provides fluid communication between the internal space and an exterior of the body 100. The discharge port 120 is further configured to discharge condensate water generated from the heat exchanger to the exterior of the body. Furthermore, the air conditioner housing includes a plurality of blocking portions 110 which is formed and disposed around the discharge port 120. The blocking portions 110 protrude from an interior surface of the internal space of the body 100 and are disposed around a border of the discharge port 120. The blocking portions 110 thereby prevent foreign substances inside the body 100 from directly blocking the discharge port 120.

As illustrated in FIG. 1, the air conditioner housing of the present disclosure is provided with the body 100. The illustrated body 100 shows a part of a housing. The internal space is formed in the body 100 and a plurality of heat exchangers may be mounted in the internal space. Particularly, the heat exchanger is mounted in the internal space and is configured to cool air that flows through the internal space of the body 100 and to discharge the air to an interior of the vehicle. Various conventional heat exchangers may be used as the heat exchanger.

During this process, air around the heat exchanger is condensed on a surface of the heat exchanger by a cold refrigerant that flows through an inner portion of the heat exchanger. Accordingly, condensate water is formed and the condensate water falls downward. The condensate water is accumulated on an interior (i.e., inner) bottom surface of the body 100 of the housing.

In this manner, when condensate water is accumulated on the interior bottom surface of the body 100 and the amount of falling condensate water increases, a cooling effect may be reduced since the air that flows through the internal space of the body 100 is humidified again. Furthermore, when the amount of blowing from the air conditioner is increased, the condensate water may be blown by the produced wind, i.e., forced air, and may be discharged together with air to the interior of the vehicle. Furthermore, in a severe case, a phenomenon may occur in which the condensate water rises and overflows to the exterior of the body 100.

Therefore, the condensate water accumulated inside the body 100 is required to be properly drained to the exterior or outside of the body 100. The condensate water drained to the exterior of the body 100 may disappear by evaporation or may be discharged to an environment outside the vehicle through a separate tube.

The discharge port 120 is formed and disposed on a lower portion of the body 100 so as to properly discharge condensate water. The discharge port 120 is formed and disposed on a lower end of the body 100 and provides fluid communication between the internal space and the exterior of the body 100. As the discharge port 120 is formed on the lower portion of the body 100 among various points of the body 100, the condensate water naturally accumulates toward the lower end of the body by gravity and is discharged to the exterior of the body 100. A shape of the discharge port 120 may be variously formed. The discharge port 120 has a hole shape that communicates between the internal space inside the body 100 and the exterior of the body 100. Therefore, the discharge port 120 serves to discharge condensate generated from the heat exchanger to the exterior outside of the body 100.

Air outside the vehicle may be introduced into the air conditioner housing. In this situation, foreign substances around the vehicle, such as fallen leaves and so on, may be introduced into the air conditioner housing through a cowl of the vehicle. When such foreign substances are caught in the heat exchanger, air conditioning performance may deteriorate and the foreign substances may be introduced into the internal space. Therefore, the air conditioner housing is typically provided with a filter. However, when the performance of the filter deteriorates, the foreign substances may pass through a gap of the filter. In this situation, a phenomenon may occur in which foreign substances fall into the inner portion or internal space of the body 100 and block the discharge port 120.

When the discharge port 120 is blocked by foreign substances, a problem occurs in that the drainage of condensate water is delayed or inhibited. In a severe case, condensate water may accumulate and overflow. Therefore, in the discharge port 120, it is required to maintain drainage performance in which smoothly discharging condensate water is performed in normal times. Additionally, in the discharge port 120, it is required to maintain smooth discharge of condensate water while the discharge port 120 is not blocked by foreign substances that have accumulated around the discharge port 120.

To this end, the blocking portions 110 are formed around the discharge port 120. The blocking portions 110 protrude from an interior surface of the internal space of the body 100 from around the border of the discharge port 120. The blocking portions 110 prevent foreign substances inside the body 100 from directly blocking the discharge port 120. In addition, such blocking portions 110 are formed such that the plurality of blocking portions 110 surrounds the discharge port 120 and the plurality of blocking portions is spaced apart from each other. Therefore, by the plurality of blocking portions 110, foreign substances are prevented from coming close to the discharge port 120 and blocking the discharge port 120. Thus, the drainage of condensate water may be smoothly performed without any obstruction.

Specifically, FIGS. 2 and 3 are views illustrating an inner portion of the air conditioner housing for a vehicle according to an embodiment of the present disclosure. As illustrated in the drawings, the blocking portions 110 may have pin shapes that extend upward from a lower interior surface of the body 100. In addition, the pin shapes of the blocking portions 110 may be integrally molded with the body 100.

As an example, the body 100 may be formed of a plastic material and may be manufactured by injection molding. In this situation, the body may be molded in two parts, such as two half shell shaped parts including an upper part and a lower part. The borders, i.e., the joint or separation line of the parts may be fused together and one housing may be formed. In this process, the blocking portions 110 having shapes as illustrated, may be formed when pins are integrally molded while the body 100 of the half shell of the lower part is molded.

In addition, protrusion directions of the pins are oriented upward in the same direction as an extrusion direction of an injection mold. Thus, the molding is capable of being smoothly performed without undercuts on the mold. In addition, since the pin shapes are formed to surround the discharge port 120 and are molded to be spaced apart from each other, the pin shapes effectively block foreign substances having various sizes from approaching the discharge port 120. In this configuration, a space is secured and is not blocked while foreign substances around the discharge port 120 are caught by the blocking portions 110. Thus, the drainage of condensate water is capable of being realized.

As illustrated in FIG. 3, the blocking portions 110 include a plurality of pins disposed to be spaced apart from each other. The plurality of pins is positioned in a plurality of layers L1 and L2 surrounding the lowermost end of the body 100. Each of the layers L1 and L2 may include a plurality of the pins disposed to be spaced apart from each other. Among the plurality of pins, one pin 110' may be formed at the lowermost point of the lower portion of the body 100. In addition, the remaining pins may be spaced apart from each other along a circular line that surrounds the pin 110' at the center of the lowermost end. In other words, the blocking portions 110 are formed of the plurality of pins, and the pins closest to the lowermost end of the body 100 may be spaced apart from the lowermost point of the body 100.

In addition, such an arrangement is superimposed, so that the pins eventually form the plurality of layers L1 and L2 around the center at the lowermost end of the body 100. Circular dotted lines illustrated in FIG. 3 show the layers in which the pins are disposed.

By configuring the pins as described above, foreign substances are blocked step by step from a point far away from the discharge port 120 to a point close to the discharge port 120.

In addition, the height of the pins may be equal to or more than a diameter of the discharge port 120. In other words, as the height of the pins is formed to be larger than the diameter of the discharge port 120, foreign substances having sizes larger than the discharge port 120 are capable of being effectively blocked. Thus, the discharge port 120 is prevented from being blocked by larger sized foreign substances. If sizes of the foreign substances are smaller than the diameter of the discharge port 120, the small foreign substances may be discharged together with condensate water through the discharge port 120. Therefore, it is important that the blocking portions 110 prevent foreign substances having diameters larger than the diameter of the discharge port 120 from approaching the discharge port 120.

In addition, a separation distance between the pins may be equal to or less than the diameter of the discharge port 120. In other words, when the plurality of pins is molded, a distance between the pins is formed to be less than the diameter of the discharge port 120. Therefore, foreign substances that are larger in size than at least the diameter of the discharge port 120 are caught between the pins. Thus, the discharge port 120 is not blocked by the foreign substances and the drainage may be maintained.

FIG. 4 is a cross-sectional view illustrating the air conditioner housing for a vehicle according to an embodiment of the present disclosure. FIG. 5 is a side view illustrating the air conditioner housing for a vehicle according to an embodiment of the present disclosure.

As illustrated in FIG. 4, the lower portion of the body 100 may be formed having an inclined surface 102 having a width that gradually narrows downward, i.e., in a downward direction as depicted in FIGS. 1 and 2. The lower portion of the body 100 may be formed in a polyhedral shape having a cone shape that protrudes downward. The body 100 has the inclined surface 102 having a shape converging around the lowermost end. Condensate water is naturally collected at the lowermost end of the body 100 due to the shape. The collected condensate water is completely discharged through the discharge port 120 so that moisture inside the body 100 is removed.

In addition, as illustrated in FIG. 4, the discharge port 120 may be formed at the lowermost end of the inclined surface 102 of the lower portion of the body 100.

As illustrated in FIG. 5, an outside exterior of the lower end of the body 100 is provided with a nozzle 140 that extends outside or to the exterior from the discharge port 120. The nozzle 140 may be disposed or oriented at an angle toward a side direction, as depicted in FIG. 1.

The nozzle 140 may be integrally molded with the body 100. Condensate water may be discharged outside the body 100 through the nozzle 140. A tube and so on may be coupled to the nozzle 140 so that condensed water is capable of being discharged at a further distance. Otherwise, condensate water may be discharged to a desired point by adjusting a length of the nozzle 140. A nozzle 140 is formed in the side direction such that the inclined surface 102 of the body 100 around the discharge port 120 is formed along an inclined direction. Thus, the condensate water flowing down along the inclined surface 102 may be smoothly drained at a high speed.

As illustrated in FIG. 3, the discharge port 120 may have a first side having a shape that is recessed toward a center of the discharge port 120. In addition, the nozzle 140 that extends outside from the discharge port 120 is formed at the exterior surface of the lower end of the body 100. The nozzle 140 may be formed and disposed such that the nozzle 140 is oriented at an angle toward the side direction that is a direction opposite to a direction in which the first side of the discharge port 120 is recessed.

In other words, when the discharge port 120 has a circular shape that is partially recessed, the nozzle 140 is formed along the recessed direction, so that condensate water is directly discharged through a flow path of the nozzle 140 along the recessed portion. Thus, this configuration is capable of smoothly draining condensate at a high flow rate.

As illustrated in FIG. 5, when the discharge port 120 is viewed through the nozzle 140 from the outside, the pins of the blocking portions 110 may be seen. This is because the separation distance between the pins is smaller than the diameter of the discharge port 120, as described above. Therefore, a structure in which at least one pin is exposed through the discharge port 120 is provided. Through this structure, it can be seen that foreign substances are prevented from blocking the discharge port 120.

Particularly, an advantage of such a pin structure is that smooth drainage is capable of being performed at normal times since the diameter of the discharge port 120 is not reduced while foreign substances are blocked. If a pin or other rib shape is formed inside the nozzle 140 or the discharge port 120, a diameter of a drainage flow path of condensate water is inevitably reduced. Therefore, forming the pins inside the lower portion of the body 100 is advantageous in terms of securing the cross-sectional area of the flow path.

According to the air conditioner housing for a vehicle of the present disclosure, in discharging condensate water generated during operation of an air conditioner of the housing to the outside or exterior of the housing, a phenomenon in which the discharge port is blocked by foreign substances may be effectively prevented. Furthermore, the discharging of condensate water may be smoothly performed.

Particularly, as the blocking portions are formed of the plurality of pins and the sizes and the spacing distances of the pins and a relationship of the pins and the discharge port are optimally set, the discharge port may be prevented from being blocked by foreign substances of any sizes.

In addition, even if foreign substances are caught in the blocking portions, the basic condensate water drainage function of the discharge port may not deteriorate.

Although embodiments of the present disclosure have been described herein, it is understood that the present disclosure should not be limited to these embodiments. Various changes and modifications can be made by those having ordinary skill in the art within the spirit and scope of the present disclosure.

What is claimed is:

1. An air conditioner housing for a vehicle, the air conditioner housing comprising:
    a body having an internal space through which air flows and having a heat exchanger mounted at the internal space, the heat exchanger being configured to cool air;
    a discharge port formed at a lower end of the body, the discharge port providing fluid communicating between the internal space and an exterior of the body and discharging condensate water generated from the heat exchanger to the exterior of the body; and
    a plurality of blocking portions disposed around the discharge port and protruding into the internal space of the body, thereby preventing foreign substances inside the body from directly blocking the discharge port, wherein the plurality of blocking portions comprises a plurality of pins disposed spaced apart from each other, and wherein a separation distance between the plurality of pins is equal to or less than a diameter of the discharge port, wherein among the plurality of pins, one pin is formed at a lowermost point of a lower portion of the body and remaining pins are spaced apart from each other along a circular line that surrounds the one pin, and wherein a height of the plurality of pins is equal to or more than the diameter of the discharge port, and a diameter of the plurality of pins is less than the diameter of the discharge port.

2. The air conditioner housing of claim 1, wherein a lower portion of the body includes an inclined surface having a width that gradually narrows downward.

3. The air conditioner housing of claim 2, wherein the discharge port is disposed at a lowermost end of the inclined surface of the lower portion of the body.

4. The air conditioner housing of claim 1, wherein the lower end of the body has an exterior surface provided with a nozzle that extends to the exterior from the discharge port, and wherein the nozzle is oriented at an angle toward a side direction.

5. The air conditioner housing of claim 4, wherein the nozzle is integrally molded with the body.

6. The air conditioner housing of claim 1, wherein the discharge port has a first side having a shape that is recessed toward a center of the discharge port.

7. The air conditioner housing of claim 6, wherein the lower end of the body has an exterior surface provided with a nozzle that extends to the exterior from the discharge port, and wherein the nozzle is oriented at an angle toward a side direction that is opposite to a direction in which the first side of the discharge port is recessed.

8. The air conditioner housing of claim 1, wherein each blocking portion of the plurality of blocking portions has a pin shape that extends upward from a lower interior surface of the body.

9. The air conditioner housing of claim 1, wherein the plurality of pins is positioned in a plurality of layers surrounding the lowermost end of the body.

10. The air conditioner housing of claim 1, wherein the plurality of blocking portions is integrally molded with the body.

11. The air conditioner housing of claim 1, wherein pins closest to the lowermost end of the body are spaced apart from a lowermost point of the body.

* * * * *